United States Patent
Britz et al.

(10) Patent No.: US 8,767,958 B2
(45) Date of Patent: *Jul. 1, 2014

(54) SECURE OPEN-AIR COMMUNICATION SYSTEM UTILIZING MULTICHANNEL DECOYED TRANSMISSION

(75) Inventors: David M. Britz, Rumson, NJ (US); Robert Raymond Miller, II, Covent Stn, NJ (US); Nemmara K. Shankaranarayanan, Bridgewater, NJ (US)

(73) Assignee: AT&T Intellectual Property II, LP, Altanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,218

(22) Filed: Sep. 3, 2012

(65) Prior Publication Data

US 2013/0010951 A1 Jan. 10, 2013

Related U.S. Application Data

(63) Continuation of application No. 12/907,417, filed on Oct. 19, 2010, now Pat. No. 8,259,933, which is a continuation of application No. 11/082,515, filed on Mar. 16, 2005, now Pat. No. 7,848,517.

(51) Int. Cl.
*H04K 1/10* (2006.01)
(52) U.S. Cl.
USPC ............... 380/33; 380/28; 380/256; 713/153
(58) Field of Classification Search
CPC ............ H04K 1/003; H04K 1/02; H04K 1/10
USPC .......................................................... 380/33
See application file for complete search history.

(56) References Cited

U.S. PATENT DOCUMENTS

| 4,266,243 | A | * | 5/1981 | Shutterly ...................... 380/236 |
| 4,479,226 | A | | 10/1984 | Prabhu et al. |
| 4,752,939 | A | | 6/1988 | Amoroso et al. |
| 5,086,470 | A | | 2/1992 | Ballance |
| 5,341,423 | A | | 8/1994 | Nossen et al. |
| 5,446,488 | A | * | 8/1995 | Vogel ............................ 725/151 |
| 5,473,696 | A | | 12/1995 | van Breeman et al. |
| 5,844,705 | A | | 12/1998 | Rutledge |

(Continued)

FOREIGN PATENT DOCUMENTS

JP 05102945 4/1993

*Primary Examiner* — Edward Zee
*Assistant Examiner* — Baotran N To
(74) *Attorney, Agent, or Firm* — Guntin & Gust, PLC; Ralph Trementozzi (57) ABSTRACT

A secure, open-air communication system utilizes a plurality of "decoy" data signals to hide one or more true data signals. The true data signal(s) are channel hopped with the plurality of decoy data signals to form a multi-channel "scrambled" output signal that is thereafter transmitted in an open-air communication system. The greater the number of decoy signals, the greater the security provided to the open-air system. Further security may be provided by encrypting both the true and decoy signals prior to scrambling and/or by utilizing a spatially diverse set of transmitters and receivers. Without the knowledge of the channel assignment(s) for the true signal (s), an eavesdropper may be able to intercept (and, with time, perhaps descramble) the open-air transmitted signals, will not be able to distinguish the true data from the decoys without also knowing the channel assignment(s).

20 Claims, 3 Drawing Sheets

(56) References Cited

U.S. PATENT DOCUMENTS

| | | |
|---|---|---|
| 6,038,238 A | 3/2000 | Jokinen et al. |
| 6,088,595 A | 7/2000 | Ciccone et al. |
| 6,161,013 A | 12/2000 | Anderson et al. |
| 6,246,768 B1 | 6/2001 | Kim |
| 6,374,355 B1 | 4/2002 | Patel |
| 6,577,732 B1 * | 6/2003 | Kartalopoulos ............... 380/33 |
| 6,721,510 B2 | 4/2004 | Graves et al. |
| 6,731,878 B1 | 5/2004 | Britz et al. |
| 6,795,655 B1 | 9/2004 | Sidorovich et al. |
| 2002/0109884 A1 | 8/2002 | Presley et al. |
| 2003/0025589 A1 | 2/2003 | Koike |
| 2003/0174690 A1 | 9/2003 | Benveniste |
| 2003/0215176 A1 | 11/2003 | Britz et al. |
| 2004/0146296 A1 | 7/2004 | Gerszberg et al. |
| 2004/0181663 A1 | 9/2004 | Pienimaki et al. |
| 2004/0202474 A1 | 10/2004 | Britz |
| 2004/0208602 A1 | 10/2004 | Plante |

* cited by examiner

SECURE OPEN-AIR COMMUNICATION SYSTEM UTILIZING MULTICHANNEL DECOYED TRANSMISSION

CROSS-REFERENCE TO RELATED APPLICATIONS

This application is a continuation of U.S. patent application Ser. No. 12/907,417, filed Oct. 19, 2010, issued as U.S. Pat. No. 8,259,933, which is a continuation of U.S. patent application Ser. No. 11/082,515, filed Mar. 16, 2003, issued as U.S. Pat. No. 7,848,517, which are both incorporated herein by reference in their entirety.

TECHNICAL FIELD

The present invention relates to an open-air communication system and, more particularly, to an open-air communication system with increased security by utilizing a multichannel, decoyed transmission technique.

BACKGROUND OF THE INVENTION

Battlefield and tactical military communications have typically relied on field-deployed fiber optics and relatively low bandwidth radio distribution architectures to provide critical "field" communications infrastructures. While optical fiber provides broadband capabilities, it is often exposed to unintentional (and sometimes intentional) damage, limiting its operational life to a few days or hours before repair or replacement is required. Moreover, fiber is not easily deployed in mobile and frontline environments. Existing radio systems have proven robustness and mobility, but are severely lacking in bandwidth capabilities that are considered critical for modern warfare. The availability and utilization of broadband multi-channel point-to-point radio and Free Space Optical Communications (FSOC) technologies provides a means to bring fiber-like bandwidth closer to the front lines and as layered transport for broadband mobile area radios at the ground level and beyond. The bandwidth capacity of these broadband technologies provides new applications and opportunities, including enhanced communication services and the potential for enhanced communication security. The enhanced capabilities of these broadband wireless technologies is gaining the attention and consideration of various military services. Indeed, the use of FSOC and radio broadband links provides enormous benefits for military field deployments. However, the open air aspect of these technologies comes at the cost of potential interception by unintentional or hostile forces. Since these broadband links will be carrying large amounts of critical information, they clearly would be targets of interest for interception by hostile forces.

Free-space optical communication and millimeter (mm) radio systems offer two-way information transfer between remote locations without the use of wires and/or optical fibers, but each technology has transmission distance limitations associated with extreme fog, rain, smoke and dust attenuation that must be taken into consideration if optimal performance is to be expected. Hybrid FSOC/radio systems that are configured to transmit in both optical and radio frequencies (either alternately or simultaneously) have been shown to significantly reduce the attenuation effects of rain and fog and improve link performance under difficult weather conditions. Commercial versions of broadband hybrid HRL optical (FSOC) and radio wireless point-to-point systems have been in use since the late 1980's. Advanced free-space optical systems are now starting to deploy multiple optical wavelength transmission systems similar in function to the optical DWDM techniques. Based on the FCC's wireless "boundary of interest" set at 1 mm wavelength, FSOC's wavelengths and beam shaping techniques are thus not subject to licensing, spectrum interferences and the limits of shared capacity, as are the existing RF wireless technologies. Further, free-space optical communications systems may implement local area mesh network technologies for information transfer, or point-to-multipoint technology for a two-way information exchange free of government regulation or intervention.

The increasing use of free-space optical communication, as well as open-air point-to-point mm wave radio communication, for real-time government, military, and secure commercial communication applications is placing an increasing burden on methods for reducing the vulnerability of these "open" communication paths to undesired or hostile interception.

Real-time, field-transmitted data and associated data encryption keys typically have a time-dependent component after which the usefulness of the data to the desired receiver (or hostile interceptor) greatly diminishes. As such, any effective "security" method that can significantly delay (or stop) the undesired receiver's ability to derive useful data from an open-air transmission would be of interest to communities that rely on such open-air communication methods. Clearly, it is impractical and unrealistic to assume open air communications can avoid being intercepted by unwanted "motivated" recipients. Therefore, methods need to be employed that accept the reality of physical interception of the "through the air" communication by hostile recipients, while providing greatly increased complexity and time required to derive useful data from the intercepted transmission (thus, at best, recovering some portion of the information well beyond the time limit of its useful operational life).

SUMMARY OF THE INVENTION

The need remaining in the prior art is addressed by the present invention, which relates to an open-air communication system and, more particularly, to an open-air communication system with increased security by utilizing a multichannel, decoyed transmission technique.

In accordance with the present invention, at least one "true" data stream and a plurality of separate "decoy" data streams all transmitted simultaneously (using the enhanced bandwidth capacity of broadband optical/radio channels), with the decoy streams used to "hide" the true data stream(s). Prior to being transmitted, the various data streams (both true and decoy) are continuously scrambled in the time domain among a plurality of different wavelength channels ("channel hopping"). The plurality of channel-hopped signals is then transmitted through the open air to an intended receiver. Since only the intended receiver is in possession of both the key required to de-scramble the various data streams and the identity of the "true" data channel assignments (once descrambling has been applied), the ability for an unintended recipient to recover the true data stream(s) in a timely fashion is extremely limited.

In one embodiment of the present invention, more than one "true" data stream may be transmitted. As long as a sufficient number of "decoy" streams are used, a sufficient level of security can be retained. In another embodiment, both the true data signal(s) and the decoy data signals are encrypted to provide an additional layer of security, thus decreasing the possibility of a hostile party intercepting, decoding and later reassembling the message(s) from simultaneous recordings of all the channels.

Data may be loaded onto the multiple decoy channels by the utilization of random number "bit" generators for each channel (thus providing a truly random string of "decoy" data packets). Alternatively, enhanced decoy deception can be achieved through the use of "available" multiple unsecured or commercial video (live or recorded), and/or voice/music media that when loaded onto the individual decoy channels will produce "realistic" encoded bit patterns that would be difficult to distinguish from true non-decoy data by undesired human or computer analysis without having possession of the key. True and decoy channels would be clearly distinguished by a human observer receiving the encrypted media channels and having possession of the correct key. Without the aid of the proper key, a "human receiver" would be unable to distinguish a channel carrying encrypted "live" video conference data from a decoy channel carrying an encrypted, pre-recorded rock music video. With the proper key required to de-scramble the signals, the true video conference channel would be obvious among the channel choices for the proper human receiver.

In an extension of the teaching of the present invention, a plurality of spatially disparate transmitters and spatially disparate receivers may be used, with the true data signal being not only "channel hopped", but "transmitter hopped". Again, a human observer (or computer) in possession of the proper de-scrambling key will know the sequence required to re-stitch the true data signal(s) back together at the output of the multiple receivers.

Although the subject matter of the present invention is clearly relevant to optical and radio wireless secure transmission methods, it is to be understood that the same approach may be equally applied to secure DWDM fiber optics links. Additionally, "hybrid" configurations, as described above, may also benefit from the application of the multi-channel, decoyed transmission system of the present invention. In this case, the true data and decoy signals may be "hopped" between optical and radio signal paths to provide further diversity/scrambling in the open-air communication system.

Other and further embodiments and advantages of the present invention will become apparent during the course of the following description and by reference to the accompanying drawings.

BRIEF DESCRIPTION OF THE DRAWINGS

Referring now to the drawings.

DETAILED DESCRIPTION OF THE DRAWINGS

As will be discussed in detail below, the present invention is related to an Open-air multi-channel communication link, such dense wavelength-division multiplexed (multi-wavelength DWDM) free-space optic links and multi-channel orthogonal frequency-division multiplexed (multi-channel OFDM) radio links. A significant aspect of the present invention is the transmission of a small number of "true" data signals along with a plurality of "decoy" data signals. The true and decoy data signals are processed at an open-air multi-channel transmitter so as to "hop" channels based on a secret sequence, where in a preferred embodiment both the true and decoy signals are encrypted prior to initiating the hopping function. Thus, instead of a simple encrypted transmission, as in the prior art, the present invention provides true data signal transmission that hops channels, interspersed with similar decoy transmissions that hop in and out of the same channels so as to "hide" the true data signal(s) among a plurality of decoy data signals. The intent is to increase the difficulty of deciphering the message, as well as to increase the complexity of a receiver configuration (i.e., requiring a wider bandwidth) that would be required by an eavesdropper.

Figure 1:
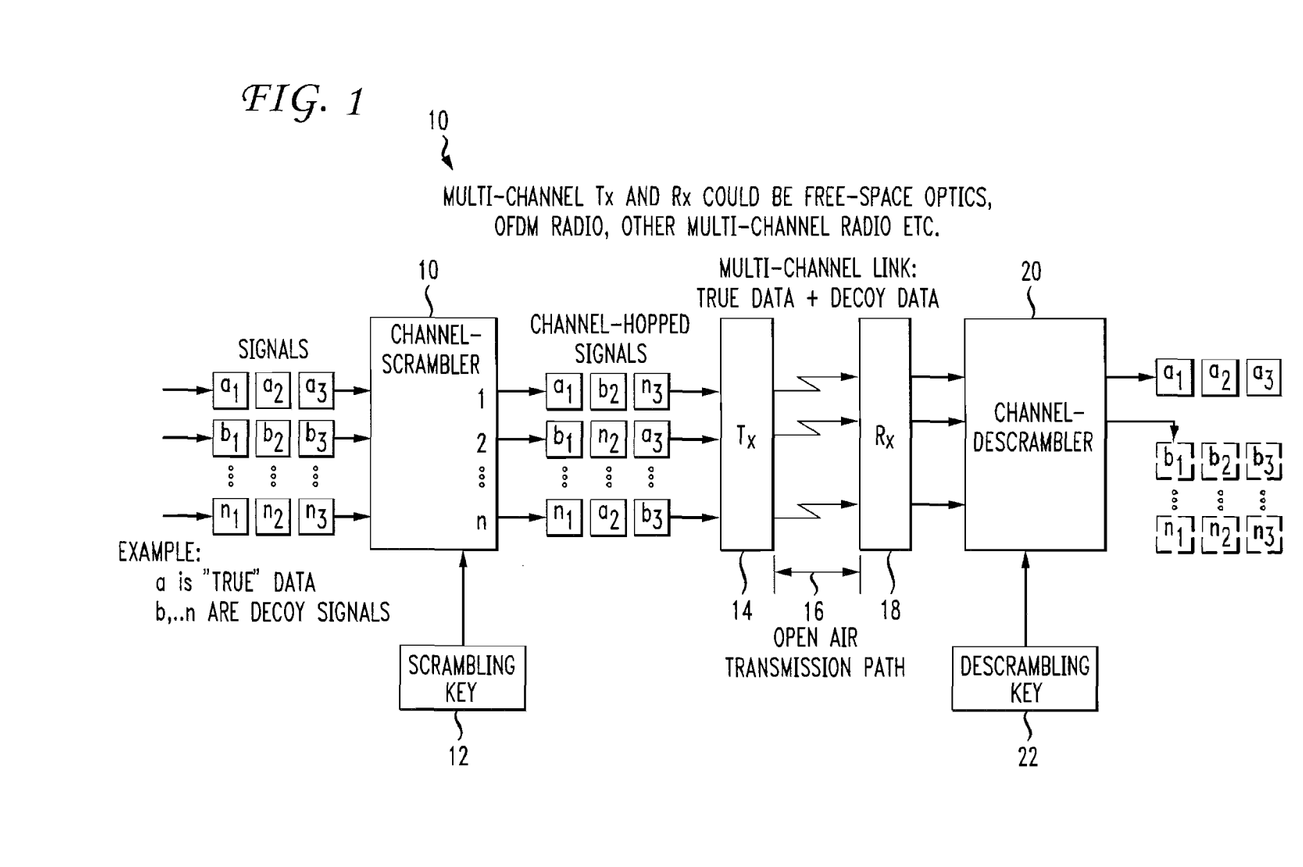
FIG. 1 contains a simplified block diagram of an exemplary arrangement for implementing the multi-channel, decoyed open-air transmission system of the present invention.

FIG. 1 contains a simplified diagram illustrating, in general terms, the principles of the present invention as can be applied in any type of "open air" communication system—optical, radio or a hybrid combination of the two. In the arrangement as illustrated in FIG. 1, it is presumed that the first data signal stream (labeled "a") is the "true" data signal, and the remaining data signal streams (labeled "b" through "n") are "decoy" data signals (in some cases, more than one "true" data signal may be transmitted). As shown, the plurality of data signal streams are applied as parallel inputs to a channel scrambler 10, where channel scrambler 10 is controlled by a scrambling key generator 12. Key generators are well-known in the art, and any suitable arrangement may be used for the purposes of the present invention. As illustrated in FIG. 1, the combination of channel scrambler 10 and scrambling key generator 12 functions to "hop" the packets of each signal stream in a random pattern (controlled by the scrambling key) such that each output channel 1, 2, . . . n from channel scrambler 10 comprises packets of each data signal stream (both true and decoy). The multi-channel, scrambled outputs from channel scrambler 10 are subsequently applied as parallel inputs to multi-channel transmitter 14, where transmitter 14 is an "open air" transmitter and functions to essentially broadcast the plurality of n signals, as illustrated by open air transmission path 16 in FIG. 1.

Inasmuch as the broadcasted signals are scrambled across the plurality of n separate channels (wavelengths/frequencies) and include a number of "decoy" signals, the ability of an eavesdropper to recover any relevant data is minimal. While an eavesdropper may be able to physically recover the plurality of n broadcasted signals, his ability to de-scramble the signals is extremely limited. Moreover, the inclusion of a number of decoy signals makes the process even more difficult in that an eavesdropper would not be able to tell the difference between the true data and the decoy data without knowing the identity of the true data channel assignments. Obviously, as the number of channels and/or the number of decoy signals increases, the robustness of the security system increases as well. Moreover, as mentioned above, "realistic" signals may be used as the decoy streams (live/recorded video, music, etc.) such that these signals will generate encoded bit patterns difficult to distinguish from the true data. Alternatively, random number generators may be used to provide the decoy data streams (considered to be a less expensive alternative). In either case, without the knowledge of the particular channel assignments, an eavesdropper will in most cases be unable to ascertain which channel(s) are carrying true data.

Referring again to FIG. 1, the plurality of n scrambled signals is intercepted by an open-air receiver 18, where receiver 18 is the intended receiving device and comprises a multi-channel receiver capable of separately recovering each one of the plurality of n signals. The plurality of n recovered signals is then applied as a set of parallel inputs to a channel descrambler 20, where channel descrambler 20 is controlled by a descrambling key 22. It is to be understood that in accordance with the principles of the present invention, both scrambling key 12 and descrambling key 22 are "known" by each end of the communication path, with the particulars of descrambling key 22 being defined so as to "unscramble" the particular hopping sequence applied by channel scrambler 10. Thus, the various packets generated as an output from channel descrambler 20 will be re-assembled into a plurality of separate signals, each in its original data signal stream (both true and decoy), as shown in FIG. 1.

In accordance with the present invention, the receiver of the information must also possess the knowledge regarding the identity of which channel(s) contain true data signal(s). Thus, at the output of channel descrambler 20, the re-assembled versions of decoy data signal streams "b"-"n" can simply be ignored (hence, these data signal streams are illustrated in phantom in the output from channel descrambler 20), and the "recovered" true data signal "a" is put in the hands of its intended recipient.

The encryption of both a large number of false decoy signals and a single (or few) true data signal(s), in accordance with the present invention, is not considered to compromise the desired transmission between each link in an open air transmission system, but does add to the check sum strength of the true signal transmission protection and, conversely, to the processing complexity required for an "intercepting" receiver who is blind to the key controller algorithm.

In terms of functionality, a free-space optics link with multiple wavelengths is similar to a multi-channel point-to-point (PTP) radio link that employs directional antennas at each end. In addition, there are point-to-multipoint (PMP) and peer-to-peer radio systems that use omnidirectional antennas to communicate with units in an unspecified/unknown direction. The application of the present invention to free-space radio transmission systems is best illustrated by a PTP OFDM (orthogonal frequency division multiplexing) radio link. OFDM is a specific means of conveniently transmitting radio signals on multiple frequency carriers. In this technique, the multiple carriers overlap in the spectrum domain. Transmission and reception involves the use of inverse Fast Fourier Transforms (IFFT) and FFT, respectively, to be able to insert and extract information on frequency carriers. In association with the present invention, the true data signal bit stream is channeled to different OFDM carriers at different times, as shown in FIG. 1. At the receiver, the true data signal is extracted by selecting different channels based on the descrambler key and stitching back (re-assembling) the data stream, ignoring the decoy signals.

In principle, the multi-channel communication system as used in the present invention can be any multi-frequency system, and need not be based on OFDM. For example, multiple channels of an 802.11 wireless LAN may be used. In this case, besides hiding the true signal among decoy signals, a transmitter with enough power and resources can effectively jam an area by using the decoy signals to suppress other uses of the radio spectrum. This may be particularly relevant in semi-military situations in an area with other unlicensed radios.

While the diagram of FIG. 1 (as well as the remaining figures) illustrate the principles of the present invention as applied in a half-duplex arrangement, it is to be understood that the present invention is equally applicable to a full duplex arrangement utilizing operational transceivers at various link locations, each transceiver equipped with the necessary scrambling and descrambling keys.

Figure 2:
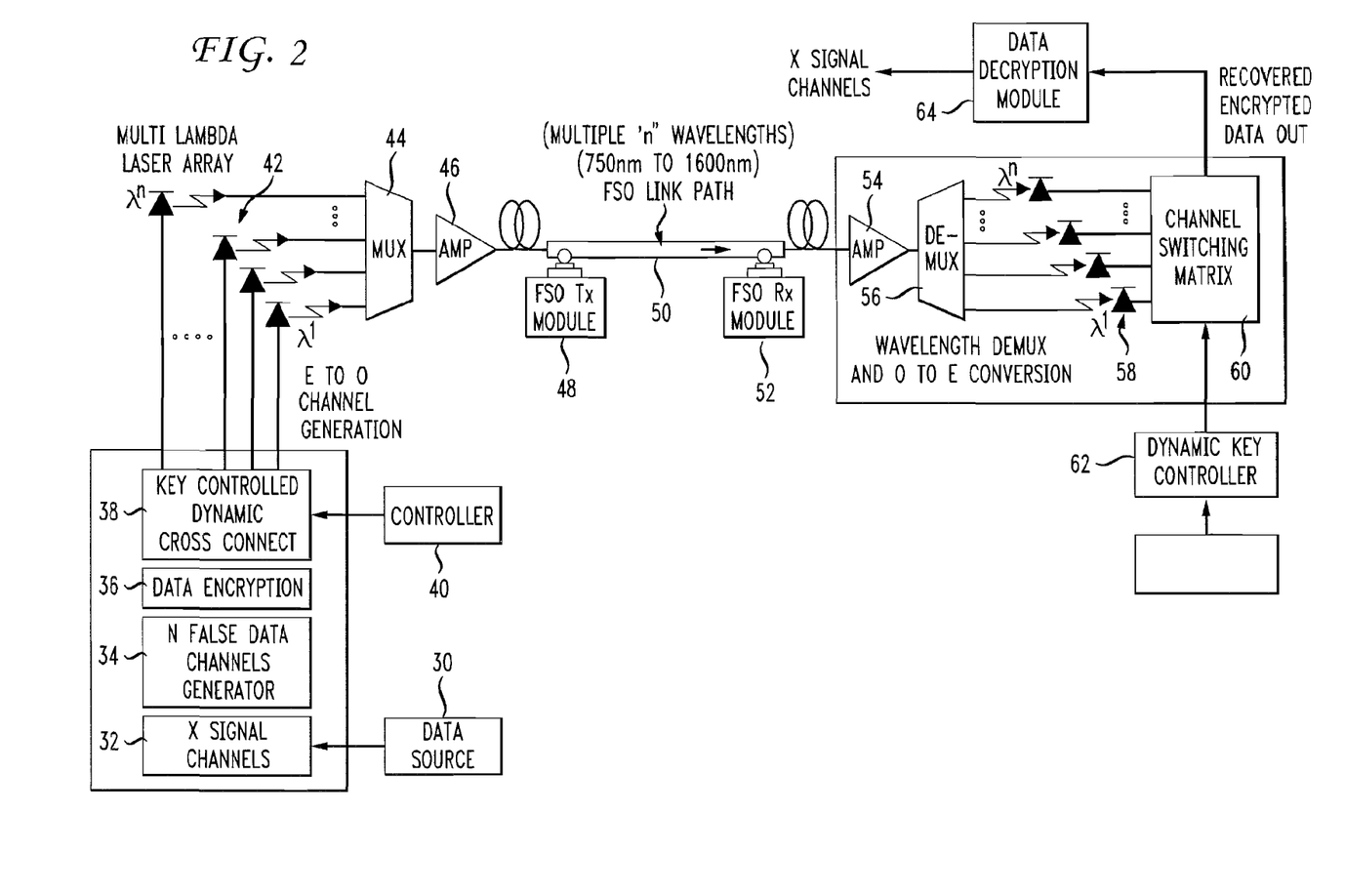
FIG. 2 illustrates an exemplary architecture that may be used in one embodiment of the present invention.

In a further embodiment of the present invention, an encryption technique may be applied to both the true and decoy data prior to scrambling, thus adding another level of security to the open air transmission. FIG. 2 illustrates an exemplary arrangement employing both encryption and channel hopping/scrambling in accordance with the present invention. In this particular embodiment, a plurality of X "true" data signals are desired to be transmitted through an open air communication system in as secure an arrangement as possible. A plurality of N "decoy" data signals are employed to supplement the plurality of X true signals such that a total of N+X data signals will be transmitted through the open-air communication system. As shown in FIG. 2, data from a data source 30 is used as the input for the plurality of X data signals 32 and a signal generator 34 is used to supply the plurality of N decoy signals. A data encryption system 36 is then used to separately encode each one of the plurality of N+X signals. The encrypted signals are then applied as separate, parallel inputs to a key-controlled dynamic cross-connect element 38, where element 38 is configured in accordance with the output from a key controller 40. In an alternative arrangement (not shown), the data may be encrypted elsewhere, and arrive at the transmitter in its encrypted form. In this case, the already-encrypted data is combined with the decoy information and transmitted in the manner discussed above.

As mentioned above, the decoyed, frequency-hopped secure transmission system of the present invention is equally applicable to open-air, radio-signal based transmission systems as well as open-air, optical-signal based transmission systems and multi-wavelength DWDM and CWDM fiber optics links. The particular arrangement as shown in FIG. 2 illustrates a hybrid system, where the input signals (true data and decoy data) are electrical and the encryption occurs in the electrical domain. Similarly, the channel hopping key is applied, using dynamic cross-connect element 38, in the electrical domain. Thus, the output from dynamic cross-connect element 38 is a plurality of N+X encrypted, channel-hopped electrical data signals. These electrical signals are then used as an input to an array of N+X optical transmitting devices 42, where each device in the array operates at a different wavelength $\lambda 1$-$\lambda n$ (n=N+X) and thus produces a plurality of N+X optical, scrambled signals.

The plurality of N+X optical signals are thereafter applied as separate inputs to a DWDM multiplexer 44 so as to form an optical output signal comprising a multiplexed version of the various signals. It is to be understood that the multiplexing function is merely used to form the optical output signal and does not enhance the encryption/scrambling characteristics of the present invention. The multiplexed signal may be amplified (for example, using an optical amplifier 46) and then applied as an input to a free space optical transmitter 48. The multiplexed optical signal then propagates through free space (represented by the numeral 50 in FIG. 2) and is thereafter received by a free space optical receiver module 52. Inasmuch as the signal propagates through free space, various "hostile" receivers may also intercept the transmitted signal. However, in accordance with the present invention, it will be virtually impossible for a hostile receiver to: (1) descramble the multiplexed signal stream; (2) decrypt the "descrambled" signals; and (3) determine that one or more channels are associated with "decoy" data. Thus, the use of scrambled, decoy signals (with encryption in this embodiment) is thought to form a secure method for implementing open air transmission.

Referring back to FIG. 2, the recovery of the plurality of X true data signals by the intended receiver begins with amplifying (if necessary, using an optical amplifier 54, for example) the received optical signal and demultiplexing the received signal into a plurality of N+X separate optical signals. A conventional demultiplexer 56 is used for this function, where the plurality of N+X optical output signals from demultiplexer 56 is applied as an input to a plurality of photodiodes 58, used to perform an optical-to-electrical conversion on the plurality of N+X signals. As shown, the plurality of N+X electrical signals (which are still scrambled and encrypted) are applied as an input to a channel switching matrix 60, where a dynamic key controller 62 is applied as the second input to switching matrix 60. As with the arrangement described above, the "keys" used at the transmitter and receiver are identical (and known only to the bona tide transmitter and bona tide receiver) so that the scrambling performed within cross-connect 38 at the transmitter may be "undone" at switching matrix 60, and the original (still encrypted) signals re-assembled into a plurality of N decoy signals and X true signals, as shown. Inasmuch as the intended receiver will know the identity of the channel(s) assigned to the true data, the N decoy signals may be ignored and the "known" decryption algorithm applied to a data decryption module 64 so as to recover the X separate true data signals.

It is to be understood that in the concept of decoyed multi-wavelength tree-space optical applications in accordance with the above-described embodiment of FIG. 2, the electrical-to-optical conversion and utilization of an electrical channel switching matrix can be equally implemented by using all-optical switching mechanisms that require no conversions. Such optical switching devices are available in many forms, such as through the utilization of photonic crystals and/or MEMS-arrayed steering mirrors. Additionally, this arrangement (as with that of FIG. 1) can also be implemented in a full-duplex mode.

Further, the multiple wavelength source for this particular embodiment of the present invention does not, by its nature, exclude a broad range of suitable wavelength sources and modulation techniques that alternatively may be used in accordance with the present invention. The multiple wavelength transmission source can be provided, for example, from a number of existing sources such as existing fiber optic network DWDM sources, or local multiple laser arrays that are directly modulated or multiple wavelength specific CW laser or LED/vixel arrays that utilize externally controlled modulators. In fact, a suitable white light source and wavelength/channel generating diffraction grating or narrow channel optical filters coupled to a wavelength/channel specific external high speed optical modulators and amplifiers may equally be employed to generate a spectrally broad range of wavelengths/modulated channels of interest. It is assumed that standard optical amplification techniques may be employed, where appropriate, to make up for system losses.

Figure 3:
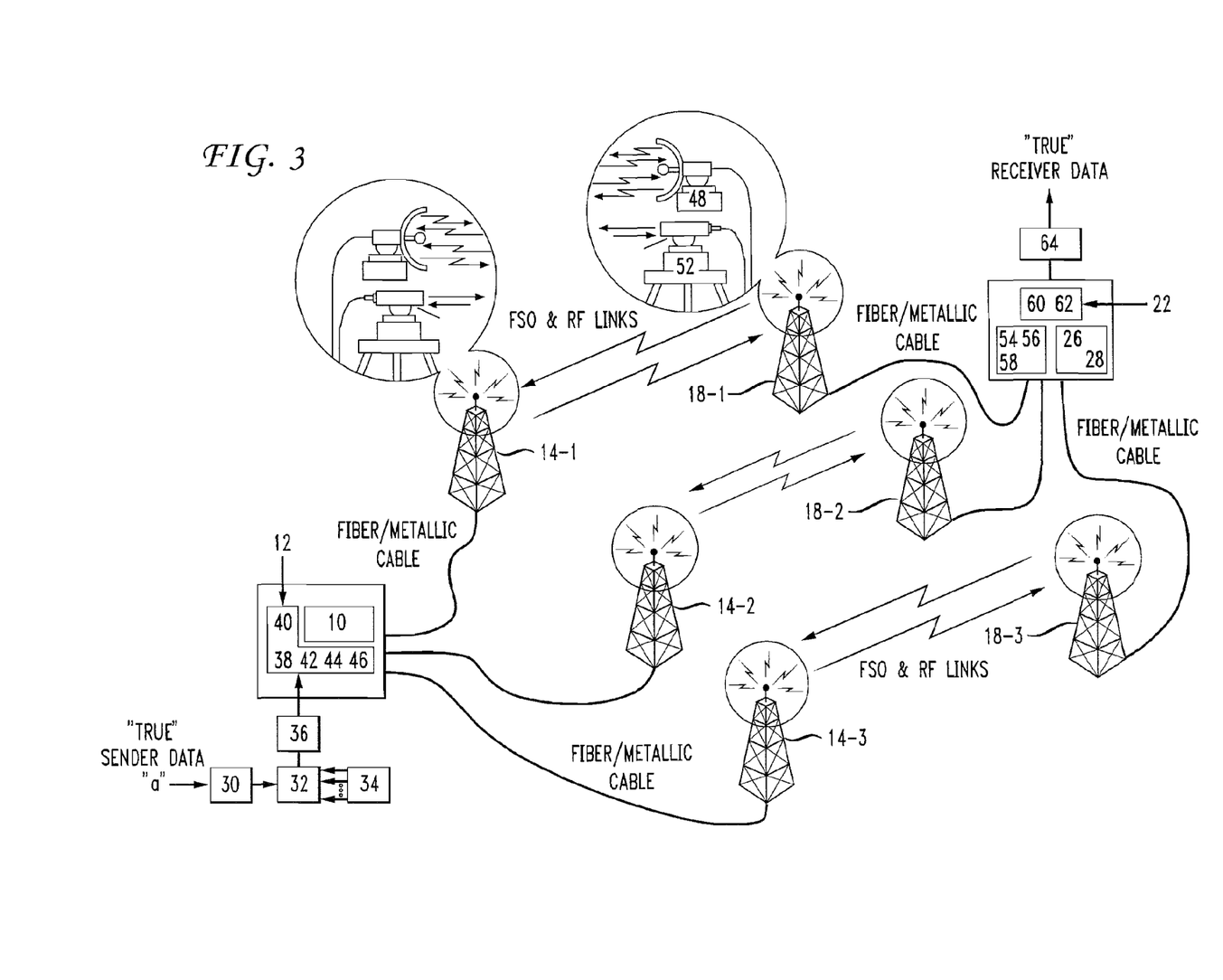
FIG. 3 contains a diagram illustrating an alternative embodiment of the present invention employing transmitter/receiver spatial diversity to provide additional security to the open-air transmission.

In a further variation of the teachings of the present invention, a plurality of spatially disparate transmitters and a similar plurality of spatially disparate receivers may be utilized to further improve the security of open-air communication through the use of spatial diversity. Referring to FIG. 3, a relatively simple embodiment of this variation is shown, using a set of three spatially disparate transmitters 14-1, 14-2 and 14-3 and a set of three spatially disparate receivers 18-1, 18-2 and 18-3. In this particular embodiment, the "transmitters" and "receivers" are illustrated as "transceivers" (i.e., capable of transmission in both directions, as indicated by the arrows). Further, the transceivers are illustrated (in the enlarged portions of the figure) as including both an optical transceiver and a radio transceiver, thus being able to provide optical/radio diversity in association with the spatial diversity.

In accordance with the present invention, channel scrambler 10 is configured to provide continuous channel hopping between the separate outputs of each transmitter, as controlled by a single scrambling key 12. The same set of true data signals (denoted by input data stream "a"), and the same plurality of decoy signals (denoted by streams "b" through "n") are applied as inputs to scrambler 10. The scrambled outputs are subsequently applied as inputs to associated open-air multi-channel transmitters 14-1, 14-2 and 14-3.

As shown in FIG. 3, the outputs from transmitters 14-1, 14-2 and 14-3 are thereafter broadcast through free space and received by multi-channel receivers 18-1, 18-2 and 18-3. Since descrambler 20 is controlled by the same channel hopping key (through descrambling key 22), only the desired receiving party will be able to identify the true data packets and re-stitch the aggregated and temporally unsynchronized packets back together in the proper order. In this case, switching of the channels between the spatially diverse transmitters effectively creates wavelength and transmitter-specific data "packets" that are routed based on the key known only by scrambling key 12 and descrambling key 22, with the spatial diversity of using multiple transmitters and receivers allowing for the true and decoy data to be broken up into disjointed and uncorrelated "packets" of data that would be meaningless to an observer that is not in possession of the proper "receiver stitching" key. As with the arrangement described above in association with FIG. 2, a decryption unit 64 may be utilized to recover the "true" data from its encrypted version once it has been restored in its proper time sequence.

While the foregoing has described what are considered to be the best mode and/or other preferred embodiments of the invention, it is to be understood that various modifications may be made therein and that the invention may be implemented in various forms and embodiments, and that it may be applied in numerous applications, only some of which have been described herein. It is intended by the following claims to claim any and all modifications and variations that fall within the true scope of the invention.

What is claimed is:

1. A method, comprising:
    receiving a true data signal at a channel input of a channel scrambling unit, wherein the channel scrambling unit comprises an original set of channel assignments;
    receiving at respective channel inputs of the channel scrambling unit, a plurality of decoy data signals;
    scrambling, by the channel scrambling unit, the original set of channel assignments for both the true data signal and the plurality of decoy data signals to form, at a plurality of channel outputs, a plurality of scrambled signals using a predefined channel assignment scrambling key; and
    applying, by the channel scrambling unit, the plurality of scrambled signals to a plurality of inputs of a multi-channel transmitter for transmission of the plurality of scrambled signals across a communication system.

2. The method of claim 1, further comprising encrypting the true data signal prior to receiving the true data signal at the channel input of the channel scrambling unit.

3. The method of claim 2, further comprising encrypting the plurality of decoy data signals prior to receiving the plurality of decoy data signals at the respective channel inputs of the channel scrambling unit.

4. The method of claim 1, further comprising transmitting, by the multi-channel transmitter, the plurality of scrambled signals as open-air scrambled signals across the communication system.

5. The method of claim 1, further comprising transmitting, by the multi-channel transmitter, the plurality of scrambled signals across the communication system as one of open-air radio scrambled signals, open-air optical scrambled signals, or fiber optic scrambled signals.

6. The method of claim 1, further comprising transmitting the plurality of scrambled signals as fiber-optic scrambled signals across the communication system.

7. The method of claim 1, wherein the scrambling of the original set of channel assignments for the true data signal and the plurality of decoy data signals to form at a plurality of channel outputs, comprises performing optical switching.

8. The method of claim 1, wherein the applying of the plurality of scrambled signals comprises applying, by the channel scrambling unit, the plurality of scrambled signals to a plurality of inputs of more than one multi-channel transmitter for transmission of the plurality of scrambled signals across the communication system, wherein the true data signal is scrambled together with the decoy data signal of the plurality of decoy data signals among the plurality of channel outputs of the more than one multichannel transmitter, wherein some of the more than one multichannel transmitters are spatially disparate.

9. An apparatus, comprising:
a channel scrambling unit comprising:
a plurality of channel inputs, wherein each channel input of the plurality of channel inputs is configured to receive a respective one of a true data signal and a plurality of decoy signals;
a plurality of channel outputs;
an original set of channel assignments between the plurality of channel inputs and the plurality of channel outputs; and
a scrambling key input that is configured to receive a scrambling key for temporally varying the original set of channel assignments in accordance with the scrambling key, wherein temporal variance of the original set of channel assignments results in a plurality of scrambled output signals at the plurality of channel outputs, wherein the plurality of scrambled output signals are provided to a plurality of inputs of a multi-channel transmitter, and wherein the multi-channel transmitter initiates a transmission of the plurality of scrambled output signals across a communication system.

10. The apparatus of claim 9, further comprising an encryption unit in communication with a channel input of the plurality of channel inputs, wherein the encryption unit applies a predetermined encryption algorithm to one of the true data signal or the plurality of decoy signals.

11. The apparatus of claim 9, wherein the transmission of the plurality of scrambled output signals across the communication system comprises one of open-air optical transmission, open-air radio transmission, or open-air optical transmission and open-air radio transmission.

12. The apparatus of claim 9, wherein the transmission of the plurality of scrambled output signals across the communication system comprises fiber-optic transmission.

13. The apparatus of claim 9, further comprising:
a channel descrambling unit comprising:
a plurality of channel inputs, wherein each channel input of the plurality of channel inputs is configured to receive a respective one of a true data signal and a plurality of decoy signals;
a plurality of channel outputs;
an original set of channel assignments between the plurality of channel inputs and the plurality of channel outputs; and
a descrambling key input that is configured to receive a descrambling key for temporally varying the original set of channel assignments in accordance with the descrambling key, wherein temporal variance of the original set of channel assignments results in a plurality of descrambled output signals at the plurality of channel outputs, wherein each channel input of the plurality of channel inputs is configured to receive a respective one of a true data signal and a plurality of decoy signals.

14. The apparatus of claim 9, further comprising an optical switching mechanism in communication between the plurality of channel inputs and the plurality of channel outputs, the optical switch mechanism temporally varying the original set of channel assignments in accordance with the scrambling key.

15. The apparatus of claim 9, wherein the plurality of scrambled channel output signals are provided to a plurality of inputs of a plurality of spatially disparate multi-channel transmitters for spatially diverse transmission of the plurality of scrambled signals across a communication system.

16. A method, comprising:
receiving at respective channel inputs of a channel scrambling unit, a true data signal and a plurality of decoy data signals, wherein the channel scrambling unit comprises an original set of channel assignments;
scrambling, by the channel scrambling unit, the original set of channel assignments for the true data signal and the plurality of decoy data signals to form a plurality of scrambled signals using a predefined channel assignment scrambling key;
transmitting, by a multi-channel transmitter, a plurality of scrambled signals comprising the plurality of scrambled signals across a communication system;
receiving, at a multi-channel receiver, across the communication system, the plurality of scrambled signals comprising the plurality of scrambled signals;
descrambling, at a channel descrambling unit, the plurality of scrambled signals using a predefined channel assignment descrambling key, wherein scrambled packets of the plurality of scrambled signals are reorganized into the original set of channel assignments for the at least one true data signal.

17. The method of claim 16, wherein the predefined channel assignment descrambling key is identical to the predefined channel assignment scrambling key.

18. The method of claim 16, wherein a one decoy data signal of the plurality of decoy data signals is selected from a group of signals consisting of live video, recorded video, live music, recorded music and combinations thereof.

19. The method of claim 16, wherein transmitting the plurality of scrambled signals across the communication system comprises one of open-air optical transmission, open-air radio transmission, or optical fiber transmission.

20. The method of claim 16, further comprising:
encrypting, by an encryption unit, a channel input prior to transmitting the plurality of scrambled signals across the communication system; and
decrypting, by a decryption unit, a one channel input, subsequent to transmitting the plurality of scrambled signals across the communication system, wherein each of the encryption unit and the decryption unit applies a predetermined encryption algorithm to the true data signal.

* * * * *